United States Patent
Jarus et al.

(10) Patent No.: US 8,153,710 B2
(45) Date of Patent: Apr. 10, 2012

(54) WEATHERABLE POLYOLEFIN NANOCOMPOSITES

(75) Inventors: David A. Jarus, Avon Lake, OH (US); Guoqiang Qian, Arlington Heights, IL (US)

(73) Assignees: Polyone Corporation, Avon Lake, OH (US); Amcol International Corporation, Arlington Heights, IL (US)

( * ) Notice: Subject to any disclaimer, the term of this patent is extended or adjusted under 35 U.S.C. 154(b) by 0 days.

(21) Appl. No.: 13/073,565

(22) Filed: Mar. 28, 2011

(65) Prior Publication Data

US 2011/0172334 A1 Jul. 14, 2011

Related U.S. Application Data

(62) Division of application No. 12/295,531, filed as application No. PCT/US2007/064998 on Mar. 27, 2007, now Pat. No. 7,935,751.

(60) Provisional application No. 60/744,621, filed on Apr. 11, 2006.

(51) Int. Cl.
C08K 5/5415 (2006.01)
C08K 5/3475 (2006.01)
(52) U.S. Cl. .......... 524/91; 524/261; 524/445; 524/127; 524/236; 356/51; 428/412; 428/451
(58) Field of Classification Search .................... 524/91, 524/261, 445, 127, 236; 356/51; 428/412, 428/451
See application file for complete search history.

(56) References Cited

U.S. PATENT DOCUMENTS 6,872,766 B2 * 3/2005 Schunk et al. ................ 524/357
* cited by examiner

*Primary Examiner* — Robert D. Harlan
(74) *Attorney, Agent, or Firm* — John H. Hornickel; Richard H. Anderson

(57) ABSTRACT

A method is disclosed concerning discovering how the use of an additive in a polyolefin compound affects the weatherability of that compound, Applying that technique, a weatherable polyolefin nanocomposite is disclosed, which contains UV stabilizers that filter wavelengths in a range influenced by presence of organoclay in the nanocomposite.

18 Claims, 1 Drawing Sheet

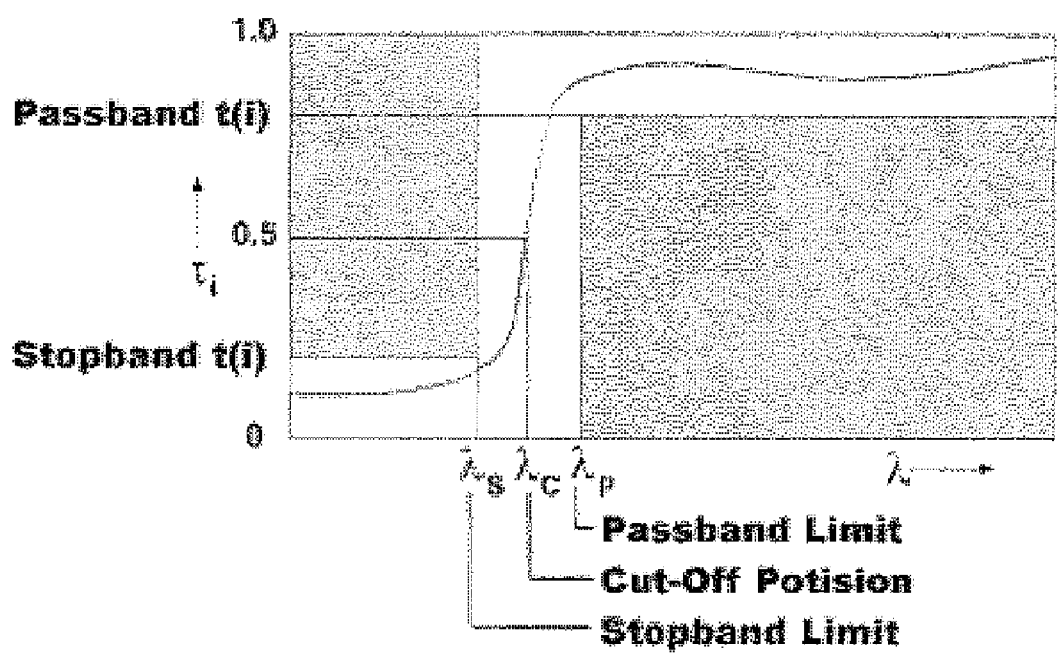

WEATHERABLE POLYOLEFIN NANOCOMPOSITES

CLAIM OF PRIORITY

This application claims priority from U.S. Provisional Patent Application Ser. No. 60/744,621 and filed on Apr. 11, 2006, which is incorporated by reference.

FIELD OF THE INVENTION

This invention concerns composites of polyolefins and organoclay that are weatherable notwithstanding exposure to ultra-violet radiation.

BACKGROUND OF THE INVENTION

The mixture of organoclays and polyolefins, commonly called polyolefin nanocomposites, is highly desired because organoclays can add stiffness and toughness to polyolefin-containing compounds. Polyolefins for plastic structures have been useful since the mid-20$^{th}$ Century. Organoclays, smectite inorganic clays intercalated with organic ions, such as quaternary ammonium, have become useful in the last decade.

The UV stabilization of nanocomposites has shown to be difficult when not in black or grey colors, typical of hard to stabilize polymers. Initial results showed large changed in color (Delta E or ΔE) very quickly, and "crazing" at low exposure times.

As explained in Wikipedia, crazing is one phenomenon that frequently precedes fracture in some glassy thermoplastic polymers. Associated with crazes are regions of very localized yielding, which lead to the formation of small and interconnected microvoids. Fibrillar bridges form between these microvoids wherein molecular chains become oriented. If the applied tensile load is sufficient, these bridges elongate and break, causing the microvoids to grow and coalesce; as the microvoids coalesce, cracks begin to form.

A craze is different from a crack in that it can support a load across its face. Furthermore, this process of craze growth prior to cracking absorbs fracture energy and effectively increases the fracture toughness of the polymer. Crazes form at high stressed regions associated with scratches, flaws, and molecular inhomogeneities: in addition they propagate perpendicular to the applied tensile stress, and typically are 5 μm or less thick. It occurs mostly in amorphous, brittle polymers like polystyrene (PS), and polymethylmethacrylate (PMMA). The appearance of white color is caused by the presence of air in the craze.

Though polypropylene and thermoplastic polyolefins (TPOs) without organoclay are usually quite weatherable, with organoclay nanocomposite materials are much worse in UV performance.

SUMMARY OF THE INVENTION

Quite unexpectedly, it has been found that the wavelengths at which polyolefin nanocomposites degrade are different than the wavelengths for the polyolefin compounds without organoclay in them. In short, conventional ultra-violet (UV) stabilizers for polyolefin compounds do not protect polyolefin nanocomposites.

Thus, one aspect of this invention is a method of discovering how the use of an additive in a polyolefin compound affects the weatherability of that compound, comprising the steps of (a) exposing the compound with an absorption filter at a specific wavelength for a specific amount of time; (b) exposing the same compound without the absorption filter at the specific wavelength for the specific amount of time; (c) repeating steps (a) and (b) with different filters at different wavelengths to determine what wavelengths cause degradation or crazing of the compound; (d) selecting a material that absorbs at the wavelengths which cause degradation or crazing.

Another aspect of the present invention is a weatherable polyolefin nanocomposite that comprises (a) polyolefin, (b) organoclay, (c) compatibilizer, and (d) UV stabilizers that filter wavelengths in a range influenced by presence of organoclay in the nanocomposite.

Another aspect of the invention are articles made from the weatherable polyolefin nanocomposite.

Features and advantages of the invention will be explained below while discussing the embodiments.

BRIEF DESCRIPTION OF THE DRAWING

FIG. 1 is a graph of demonstrating the cut-off value for a UV stabilizer compound, the wavelength at which the UV transmission curve is at 50% transmission.

EMBODIMENTS OF THE INVENTION

Polyolefin

"Polyolefin" includes homopolymers, copolymers, blends of polymers, mixtures of polymers, alloys of polymers, and combinations thereof, where at least one of the polymers is polymerized from an olefin monomer having from 2 to about 8 carbon atoms.

Within the broad definition above, non-limiting examples of polyolefins suitable for the present invention include polyethylene (including low-density (LDPE), high-density, high molecular weight (HDPE), ultra-high molecular weight (UHDPE), linear-low-density (LLDPE), very-low density, etc.), maleated polypropylene, polypropylene, polybutylene, polyhexene, polyoctene, and copolymers thereof, and ethylene-vinyl-acetate (EVA) copolymer, and mixtures, blends or alloys thereof.

Particularly preferred is a blend of a polyolefin with a maleated polypropylene to serve as a compatibilizer. The maleated polypropylene is capable of increasing dispersion of organoclay into the polyolefin, commercially available from Chemtura Corporation under the Polybond brand.

Optionally, the polyolefin nanocomposite can have impact modifiers included therein. Impact modifiers are typically elastomers such as natural rubber, polyisoprene rubber, styrene-butadiene rubber, polybutadiene rubber, nitrile rubber, butyl rubber, ethylene-propylene-diene rubber (EPDM), ethylene-propylene, ethylene-hexene, and ethylene-octene copolymers, and other elastomers. Minor amounts of impact modifiers can alter the impact strength according to preferences of those skilled in the art, to be determined without undue experimentation. For example, polybutadiene rubber, ethylene-propylene-diene rubber (EPDM), ethylene-octene copolymers, and other elastomers are useful. Non-limiting examples of such elastomers are those commercially available from multinational companies such as Bayer, Dow Chemical, Uniroyal Chemical, ExxonMobil, and others. ENGAGE™ 8180, ENGAGE™ 8842, and other ENGAGE™ polyolefin elastomers are especially preferred ethylene-octene copolymers available from Dow Chemical of Midland, Mich. that function well as impact modifiers for nanocomposites of the invention.

Organoclays

Organoclay is obtained from inorganic clay usually from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin polyolefin matrix. An intercalant is an organic or semi-organic chemical capable of entering the montmorillonite clay gallery and bonding to the surface. Exfoliation describes a dispersion of an organoclay (surface treated inorganic clay) in a plastic matrix. In this invention, organoclay is exfoliated at least to some extent.

In exfoliated form, inorganic clay platelets have a flexible sheet-type structure which is remarkable for its very small size, especially the thickness of the sheet. The length and breadth of the particles range from 1.5 µm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Polyolefin Nanocomposites

Nanocomposites are the combination of the organoclay and the plastic matrix. In polymer compounding, a nanocomposite is a very convenient means of delivery of the organoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites. Particularly preferred organoclays are I24TL, I30P, and I44P from Nanocor, Inc. PolyOne markets Nanoblend™ brand nanoconcentrates, such as Nanoblend™ 1001 and 2201 brand concentrates.

Nanocomposites offer flame-retardancy properties because such nanocomposite formulations burn at a noticeably reduced burning rate and a hard char forms on the surface. They also exhibit minimum dripping and fire sparkling.

Compatibilizer

Nanocomposites benefit from the addition of compatibilizers known to those skilled in the art to assist in the dispersion of organoclay into the thermoplastic matrix. In a preferred embodiment, the compatibilizer is a grafted maleic anhydride, such as disclosed in U.S. Pat. No. 5,717,500 (Karande et al.). The use of compatibilizer is also disclosed in U.S. Pat. No. 6,632,868 (Qian et al.). Both of these patents are incorporated by reference herein for their teaching of the use of compatibilizers to disperse organoclays into the thermoplastic resin.

UV Stabilizers for Clay

UV stabilizers are additives to the nanocomposite according to the present invention. In addition to optional conventional UV stabilizers for the polyolefin, the UV stabilizers useful for the present invention protect at wavelengths influenced by the presence of the organoclay in the nanocomposite. Conventional UV stabilizers are usually added to protect the polyolefin in the thermoplastic compound.

In this invention, it has been found that the presence of organoclays in the compound require UV stabilizers which have good absorption above 320 nm. Therefore, any commercially available UV stabilizer which filters light above 320 nm is suitable for use in the present invention.

Preferably, two UVA materials can be used. Lowilite 36 brand stabilizer, and Lowilite 234 brand stabilizer, all with good absorption above 320 nm wavelength, were used in experimentation associated with this invention.

Company descriptions of these UV additives are as follows: http://sev.prnewswire.com/chemical/20041025/DEM05525102004-1.html, and http://www.cibasc.com/index/ind-index/ind-automotive/products-9/ind-aut-pro-plastic_additives-2/ind-aut-pro-pla-tinuvin_xt_850.htm.

As quoted from this public source, Lowilite 36 is a high molecular weight, benzotriazole UV absorber that offers excellent thermal properties and is particularly suited to applications requiring low volatility and high stabilizer loading. It is an excellent choice as light stabilizer for high temperature polymers like polycarbonate. The high molecular weight and the resulting low migration combined with good compatibility in the target polymers make Lowilite 36 helpful in preventing 'plate out' that is caused by additives collecting on parts of the processing unit.

As quoted from this public source, Lowilite 234 is a benzotriazole UV light absorber offering the advantage of particularly low volatility. This feature makes it especially suitable for applications involving high temperature processing such as automotive coatings, polyethyleneterephthalate, polycarbonate, and nylon, where additives may sometimes be lost due to high temperature levels.

As quoted from this public source, Lowilite 19 is a monomeric, high molecular weight, sterically hindered amine light stabilizer (HALS) that is ideally suited to pigmented polyolefin applications due to its low interaction with the pigments. With a high molecular weight structure, it is also suitable for applications requiring low volatility and high migration resistance. Lowilite 19 is also an effective antioxidant and contributes significantly to the long term heat stability of polyolefins.

As quoted from this public source, Tinuvin 850 XT is a high performance light stabilization system for weatherable polyolefins. Its use is recommended especially for paintable TPO for automotive interior and exterior applications. It is also highly effective in nonpainted molded-in-color automotive applications and for nonautomotive applications. It is a trade secret combination of hindered amine light stabilizers.

Optional Additives

The nanocomposite of the present invention can include conventional plastics additives in an amount that is sufficient to obtain a desired processing or performance property for the ultimate thermoplastic compound, but in a manner that does not disrupt the desired performance properties.

The amount should not be wasteful of the additive nor detrimental to the processing or performance of the compound. Those skilled in the art of thermoplastics compounding, without undue experimentation but with reference to such treatises as Plastics Additives Database (2004) from Plastics Design Library (www.williamandrew.com), can select from many different types of additives for inclusion into the nanocomposites of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Optional Polymers

While the nanocomposite can be made without other polymers present, it is optional to introduce other polymers into the extruder for a variety of ultimate compound properties and performances, but in a manner that does not disrupt the performance property of the nanocomposite. These materials can be blended, co-extruded, or otherwise laminated with the polyolefin for composite structures. Other resins include those selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Table 1 shows ranges of acceptable, desirable, and preferred weight percents of the various ingredients for addition to the extruder, relative to the total weight of the nanocomposite emerging from the extruder, all being expressed as approximate values. Because the additives and other polymers are optional, the low end of each range is zero.

TABLE 1

Weight Percent of Ingredients

| Ingredients | Acceptable (Wt. %) | Desirable (Wt. %) | Preferred (Wt. %) |
| --- | --- | --- | --- |
| Polyolefin | 15-99 | 25-96.25 | 25-96.25 |
| Compatibilizer | 0.075-52.5 | 0.75-45 | 0.75-45 |
| Organoclay | 0.1-70 | 3-60 | 3-60 |
| UV Stabilizer for Clay | 0.1-2 | 0.3-1.5 | 0.4-1.0 |
| Optional Additives | 0-70 | 0-50 | 0-30 |
| Optional Polymers | 0-90 | 0-65 | 0-50 |

Extruder Processing

The preparation of compounds of the present invention is uncomplicated. The compound of the present can be made in batch or continuous operations. The compound can start from a concentrate of organoclay in a thermoplastic (also called a masterbatch) or original ingredients.

Mixing occurs in an extruder that is elevated to a temperature that is sufficient to melt the polyolefin, any optional concentrate thermoplastic matrix in a concentrate, and any optional other polymers and to adequate disperse the organoclay and optional additives therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred to use a twin co-rotating screw in an extruder commercially available from Coperion Werner-Pfleiderer GmbH of Stuttgart, Germany.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
| --- | --- | --- | --- |
| Zones 1-5 Temp. | 170° C.-230° C. | 180° C.-220° C. | 190° C. |
| Zones 6-7 Temp. | 180° C.-240° C. | 180° C.-230° C. | 200° C. |
| Zones 8-9 Temp. | 190° C.-240° C. | 190° C.-230° C. | 200° C. |
| Die Temp. | 190° C.-240° C. | 190° C.-230° C. | 200° C. |
| Screw Rotation | 300-1100 rpm | 400-1000 rpm | 600-1000 rpm |
| Feeder Rate | 50-95% of available drive torque | 75-95% of available drive torque | 90-95% of available drive torque |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

Ingredient Addition Points

| Ingredient | Acceptable Zone(s) |
| --- | --- |
| Polyolefin | Throat |
| Organoclay | Throat |
| Compatibilizer | Throat |
| UV Stabilizer for Clay | Throat or downstream |
| Optional Additives | Throat or downstream |
| Optional Polymers | Throat or Downstream or Both |

Extruder speeds can range from about 50 to about 1200 revolutions per minute (rpm), and preferably from about 600 to about 1000 rpm, maximizing output without sacrificing temperature control.

Typically, the output from the extruder is pelletized for later extrusion or molding into polymeric articles.

Subsequent Processing

The nanocomposite made according to the present invention can serve either as a concentrate or as a compound. If the former, then the nanocomposite is an intermediate product, an ingredient to be added with other ingredients to subsequent compounding steps in a batch or continuous mixing apparatus. The dilution or "let-down" of the concentrate into the compound can result in an organoclay concentration in the compound ranging from about 0.25 to less than 30 weight percent, and preferably from about 3 to about 12 weight percent.

Ultimately, the compound is formed into an article using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make films of any laminate structure or articles of any conceivable shape and appearance using nanocomposites of the present invention.

USEFULNESS OF THE INVENTION

Nanocomposites of the present invention are useful for making articles of any shape. Films can be a single layer or multi-layer laminates. Any of the articles of the present invention can be made to have a particular color by use of color concentrates from PolyOne Corporation. Thus, conventional thermoplastic compounds that need increased stiffness and toughness as provided by organoclay additives can now have longer weatherable properties.

Further embodiments of the invention are described in the following Examples

EXAMPLES

Discovery of the Source of the Problem

The first set of experiments was to determine the damaging UV range for polyolefin nanocomposites. A commercial material, Nanoblend™ LST 5571 compound was exposed to UV radiation in a Q-panel QUV with a UVA 340 lamp and a 295 nm cutoff under a 24 hour cycle at 40° C. for 720 hours. The formulation for LST 5571 is given in Table A, except that it does not include any UV stabilization. Three samples plaques were exposed. Each plaque had three regions, an unexposed region, an exposed region, and a region that was filtered using a various filters.

The filters are described in Table B, and were obtained from Edmund Industrial Optics. UV-Visible testing was run to determine the absorption cutoffs of each specific filter, due to the range listed by the manufacturer, and are listed in Table B. The cut off wavelength was defined as the sharp transition of the absorption curve at 50% absorption. All wavelengths below this value were effectively blocked by the filter. The cut off value, as described by the manufacturer is depicted in FIG. 1 and at the web page: http://www.edmundoptics.com/onlinecatalog/DisplayProduct.cfm?productid=1512

The commercial material tested was prepared by molding three by six inch plaques, ⅛" thick. Molding conditions are listed in Table C.

TABLE A

Test Formulation

|  | Percent |
|---|---|
| POLYBOND X5104 Compatibilizer | 9 |
| NANOMER I.44PA Organoclay | 12 |
| ANOX BB 011/IRGANOX B225 Stabilizer | 0.3 |
| PP PROFAX 6323 polypropylene | 58.7 |
| ENGAGE 8180 polyolefin elastomer | 20 |

TABLE B

Filters used for UV wavelength study

| Filter Designation | Product Code | Measured Cut Off Wavelength (nm) |
|---|---|---|
| A | NT45-061 | 300 |
| B | NT45-421 | 320 |
| C | NT32-761 | 380 |

TABLE C

Molding conditions

| Temperatures: | | |
|---|---|---|
| Zone 1 | 195 | (° C.) |
| Zone 2 | 200 | (° C.) |

TABLE C-continued

Molding conditions

| Nozzle | 205 | (° C.) |
|---|---|---|
| Mold | 32 | (° C.) |
| Speeds: | | |
| Screw RPM | 150-200 | rpms |
| Injection Velocity | 3" | per sec. |
| Pressures: | | |
| Injection Pressure | 7 | (machine units) |
| Hold Pressure | 3 | (machine units) |
| Back Pressure | 3 | (machine units) |
| Timers: | | |
| Injection Hold (sec) | 10 | sec |
| Cure Time (sec) | 20 | sec |

Typically, for polypropylene (PP), the damaging wavelength region is 290 to 315 nm, as described in "Polypropylene—The definitive users handbook", Maier. C, Calafut T., 1998, William Andrew publishing. In typical systems, whether PP or TPO, a combination of hindered amine light stabilizers (HALS) and UV absorbers (UVA) are used to stabilize the system from UV degradation. However, polyolefins are not that UV absorptive and sometimes only HALS are used. Referencing Table B, one can see that two of three filters (B and C) block out the damaging 295-315 wavelength, and one would expect for a polypropylene that both of these filters would result in good UV stability. As demonstrated below, that is not the case.

The common visible mechanism of polypropylene or TPO degradation is by a color change, and more significantly, crazing.

Table D lists the UV performance of the plaques both filtered and unfiltered by QUV after 552 and 720 hours. In all cases, the unfiltered plaques showed crazing from UV exposure, as expected. It is apparent that filter A, which only blocks below 300 nm, does not prevent the quick and catastrophic failure of crazing in this relatively short time exposure time, also expected. Surprisingly, filter B, which blocks below 320 nm, however also showed crazing. Even more surprising, filter C, which blocks 380 nm, showed no crazing, which is a predictor that an ingredient to absorb in the 320-380 nm range should achieve good weatherability.

This much unexpected result indicates that the additional ingredients used for the nanocomposite are degraded by higher wavelengths than the base polyolefin system. Thus, polyolefin with organoclay and polypropylene-grafted-maleic anhydride is subject to degradation at different wavelengths than an unfilled polyolefin.

TABLE D

QUV performance with filtered and unfiltered UV exposure.

| Plaque | 552 hour exposure | 720 hour exposure |
|---|---|---|
| 1 - control | Crazed | Crazed |
| 1 with filter A | Crazed | Crazed |
| 2 - control | Crazed | Crazed |
| 2 with filter B | Crazed | Crazed |
| 3 - control | Crazed | Crazed |
| 3 with filter C | No crazing | No crazing |

The unexpected range of wavelengths, which was found to cause the poor performance of the nanocomposite compound, was above the 320 nm range. Traditional UVAs used in polyolefins do not address absorption much beyond the 320 nm range, if they are used at all, and using UV absorption at higher wavelengths has heretofore been unknown for polyolefin nanocomposites. Therefore, the search for an appropriate UVA absorber was then focused in materials which can absorb in the 320-380 nm range.

Solving the Problem

Combinations of UV and thermal stabilizers have been developed that achieve no crazing in polyolefin nanocomposites at 2500 kJ under SAE 1960 and with a Delta E (CIE LAB units) of approaching 6.

A matrix of materials was prepared using a fixed formulation of organoclay, compatibilizer, olefin rubber and polypropylene, with varied types of stabilizers. A blend of Nanomer® I44P organoclay and Polybond PB5104 compatibilizer was prepared for use in all blends, at a ratio of 4:3 Nanomer to compatibilizer. A list of raw ingredients appears in Table I.

Tables II-V show the experimental design. Different combinations of UV absorbers (UVA) and hindered amine light stabilizers (HALS) were studied, in combination with and without additional thermal stabilizers.

All materials were prepared by dry blending and subsequently compounding on a 16 mm Prism twin screw co-rotating extruder. Extruder conditions are shown in Table VI. Two extrusion conditions were run for each blend, with and without a nitrogen purge at the feed throat of the extruder, as detailed in Tables II-V. After compounding, materials were molded into color chips using conditions listed in Table VII. Chips were then tested in a Xenon Arc weatherometer according to specifications of SAE J1960, a typical long term exposure test for weatherable materials used by the transportation industry.

TABLE I

Raw ingredients

| MATERIAL | Description | Source |
|---|---|---|
| Ultranox 626 | Phosphite | Chemtura |
| Tinuvin XT 850 FF | HALS | Ciba |
| Lowilite 19 | HALS | Chemtura |
| Lowilite 36 | UVA | Chemtura |
| Lowilite 234 | UVA | Chemtura |
| ENGAGE 8180 | Olefinic rubber | Dow |
| PP (12MI, powdered) | PP | Various |
| Nanomer I44P | Organoclay | Nanocor |
| PolyBond X5104 | PP-g-MAH | Chemtura |

TABLE II

Formulation set 1

| | 1 | 2 | 3 | 4 |
|---|---|---|---|---|
| Ultranox 626 | | | 0.5 | 0.5 |
| Nitrogen Purge | | x | | x |
| Lowilite 19 HALS | 0.3 | 0.3 | 0.3 | 0.3 |
| Lowilite 36 UVA | 0.3 | 0.3 | 0.3 | 0.3 |
| ENGAGE 8180 | 20 | 20 | 20 | 20 |
| PP (12MI, powdered) | 65.400 | 65.400 | 64.900 | 64.900 |
| Nanomer/PB Blend (50/50) | 14.000 | 14.000 | 14.000 | 14.000 |

TABLE III

Formulation set 2

| | 5 | 6 | 7 | 8 |
|---|---|---|---|---|
| Ultranox 626 | | | 0.5 | 0.5 |
| Nitrogen Purge | | x | | x |
| Tinuvin XT 850 FF HALS | 0.3 | 0.3 | 0.3 | 0.3 |
| Lowilite 36 UVA | 0.3 | 0.3 | 0.3 | 0.3 |
| ENGAGE 8180 | 20 | 20 | 20 | 20 |
| PP (12MI, powdered) | 65.400 | 65.400 | 64.900 | 64.900 |
| Nanomer/PB Blend (50/50) | 14.000 | 14.000 | 14.000 | 14.000 |

TABLE IV

Formulation set 3

| | 9 | 10 | 11 | 12 |
|---|---|---|---|---|
| Ultranox 626 | | | 0.5 | 0.5 |
| Nitrogen Purge | | x | | x |
| Lowilite 19 HALS | 0.3 | 0.3 | 0.3 | 0.3 |
| Lowilite 234 UVA | 0.3 | 0.3 | 0.3 | 0.3 |
| ENGAGE 8180 | 20 | 20 | 20 | 20 |
| PP (12MI, powdered) | 65.400 | 65.400 | 64.900 | 64.900 |
| Nanomer/PB Blend (50/50) | 14.000 | 14.000 | 14.000 | 14.000 |

TABLE V

Formulation set 4

| | 13 | 14 | 15 | 16 |
|---|---|---|---|---|
| Ultranox 626 | | | 0.5 | 0.5 |
| Nitrogen Purge | | x | | x |
| Tinuvin XT 850 FF HALS | 0.3 | 0.3 | 0.3 | 0.3 |
| Lowilite 234 UVA | 0.3 | 0.3 | 0.3 | 0.3 |
| ENGAGE 8180 | 20 | 20 | 20 | 20 |
| PP (12MI, powdered) | 65.400 | 65.400 | 64.900 | 64.900 |
| Nanomer/PB Blend (50/50) | 14.000 | 14.000 | 14.000 | 14.000 |

TABLE VI

Extrusion conditions

| | Set |
|---|---|
| Temp | |
| Zone 1 (° C.) | 190 |
| Zone 2 (° C.) | 190 |
| Zone 3 (° C.) | 190 |
| Zone 4 (° C.) | 190 |
| Zone 5 (° C.) | 190 |
| Zone 6 (° C.) | 190 |
| Zone 7 (° C.) | 190 |
| Zone 8 (° C.) | 190 |
| Zone 9 (° C.) | 190 |
| Die Temp (° C.) | 200 |
| RPM | 500 |
| % Torque | 90% |
| Feeder Rate | 30% |
| Vent | closed |

TABLE VII

| Molding conditions | |
|---|---|
| Temperatures: | |
| Zone 1 | 195 (° C.) |
| Zone 2 | 200 (° C.) |
| Nozzle | 205 (° C.) |
| Mold | 32 (° C.) |
| Speeds: | |
| Screw RPM | 150-200 rpms |
| Injection Velocity | 3" per sec. |
| Pressures: | |
| Injection Pressure | 7 (machine units) |
| Hold Pressure | 3 (machine units) |
| Back Pressure | 3 (machine units) |
| Injection Hold (sec) | 10 sec |
| Cure Time (sec) | 20 sec |

In these examples, the goal was to determine if broad absorption UVA materials were able to stabilize polyolefin nanocomposites.

It is clear that the UVAs chosen for these examples have been recommended for non-polyolefin systems. However, in this circumstance, this invention employs these UVAs for polyolefin systems, because of their broad absorption wavelength range.

Each HALS material was chosen as state of the art in pigmented (or filled) polyolefin systems requiring good weatherability.

In addition to the combination of HALS with broad absorption UVAs, two additional effects were investigated. A phosphite thermal stabilizer was included to determine if its addition also affected UV stability. Also, the compounds were made from powdered materials under a nitrogen blanket, to determine any short term degradation of the materials prior to pellet form, could be minimized, in order to enhance later stability by introducing less degradation products.

Two main effects were measured as a function of UV aging, the change of color and the advent of crazing, both signs of failure. The weatherometer data is listed in Tables VIII-XI, with the various kJ exposures under SAE J1960. The formulation and process changes are listed above each set for convenient reference. Several comparisons are possible, within each data set, and between each data set.

TABLE VIII

Formulation Set 1
Weatherometer measurements

| | Example | | | |
|---|---|---|---|---|
| | 1 | 2 | 3 | 4 |
| ORIGINAL AVERAGE | | | | |
| L | 60.03 | 57.8 | 59.56 | 61.29 |
| A | 2.14 | 1.56 | 2.21 | 3.33 |
| B | 18.23 | 15.6 | 17.94 | 17.3 |
| EXPOSURE 31 KJ\M$^2$ | | | | |
| L | 61.87 | 61.29 | 62.26 | 65.43 |
| A | 2.18 | 1.33 | 2.11 | 2.84 |
| B | 20.8 | 18.83 | 20.6 | 18.98 |
| ΔE | 3.15 | 3.91 | 3.72 | 4.87 |
| EXPOSURE 93 KJ\M$^2$ | | | | |
| L | 61.23 | 60.71 | 61.41 | 66.04 |
| A | 2.26 | 1.36 | 2.22 | 3.02 |
| B | 19.45 | 17.84 | 19.75 | 19.26 |
| ΔE | 1.79 | 3.93 | 2.35 | 5.75 |
| EXPOSURE 193 KJ\M$^2$ | | | | |
| L | 60.45 | 61.39 | 60.04 | 66.89 |
| A | 2.22 | 1.41 | 2.27 | 3.06 |
| B | 17.88 | 17.28 | 17.89 | 19.87 |
| ΔE | 0.38 | 1.9 | 0.48 | 6.18 |
| EXPOSURE 388 KJ\M$^2$ | | | | |
| L | 60.01 | 60.78 | 59.61 | 67.38 |
| A | 2.49 | 1.56 | 2.46 | 2.62 |
| B | 16.12 | 14.21 | 15.95 | 19.04 |
| ΔE | 2.31 | 2.84 | 2.1 | 6.27 |
| EXPOSURE 771 KJ\M2 | | | | |
| L | 59.38 | | 59.08 | 66.79 |
| A | 2.59 | | 2.61 | 2.75 |
| B | 13.14 | | 13.44 | 18.74 |
| ΔE | (c)5.03 | | (c)4.69 | 5.39 |
| EXPOSURE 1500 KJ\M$^2$ | | | | |
| L | | | | 67.87 |
| A | | | | 2.35 |
| B | | | | 18.21 |
| ΔE | | | | 6.11 |
| EXPOSURE 2000 KJ\M$^2$ | | | | |
| L | | | | 68.38 |
| A | | | | 2.23 |
| B | | | | 18.11 |
| ΔE | | | | 6.62 |
| EXPOSURE 2500 KJ\M$^2$ | | | | |
| L | | | | 69.88 |
| A | | | | 1.99 |
| B | | | | 16.84 |
| ΔE | | | | 8.11 |

TABLE IX

Formulation Set 2
Weatherometer measurements

| | Example | | | |
|---|---|---|---|---|
| | 5 | 6 | 7 | 8 |
| ORIGINAL AVERAGE | | | | |
| L | 60.12 | 59.71 | 61.39 | 61.56 |
| A | 3.03 | 3.4 | 4.35 | 4.42 |
| B | 16.79 | 16.24 | 15.6 | 16.04 |
| EXPOSURE 31 KJ\M$^2$ | | | | |
| L | 62.64 | 64.18 | 66.31 | 66.96 |
| A | 2.92 | 3.09 | 3.28 | 3.34 |
| B | 19.14 | 19.88 | 17.7 | 18.45 |
| ΔE | 3.68 | 5.41 | 5.24 | 5.4 |
| EXPOSURE 93 KJ\M$^2$ | | | | |
| L | 61.69 | 63.51 | 66.86 | 66.95 |
| A | 3.21 | 3.55 | 3.05 | 3.09 |
| B | 18.51 | 18.31 | 17.99 | 18.26 |
| ΔE | 2.47 | 5.09 | 5.88 | 6.42 |
| EXPOSURE 193 KJ\M$^2$ | | | | |
| L | 61.74 | 63.92 | 66.4 | |
| A | 3.57 | 3.67 | 3.05 | |

TABLE IX-continued

Formulation Set 2
Weatherometer measurements

| | Example | | | |
|---|---|---|---|---|
| | 5 | 6 | 7 | 8 |
| B | 17.39 | 18.27 | 18.34 | |
| ΔE | 1.7 | 4.47 | 6.17 | |
| EXPOSURE 388 KJ\M² | | | | |
| L | 62.03 | 64.76 | 66.91 | |
| A | 3.68 | 3.79 | 2.85 | |
| B | 16.81 | 17.79 | 17.88 | |
| ΔE | 2.16 | 4.66 | 6.5 | |
| EXPOSURE 771 KJ\M² | | | | |
| L | 60.77 | 64.06 | | |
| A | 3.75 | 3.94 | | |
| B | 16.31 | 17.41 | | |
| ΔE | (c)0.94 | (c)4.32 | | |

TABLE X

Formulation Set 3
Weatherometer measurements

| | 9 | 10 | 11 | 12 |
|---|---|---|---|---|
| ORIGINAL AVERAGE | | | | |
| L | 60.64 | 60.32 | 61.45 | 60.4 |
| A | 3.92 | 3.84 | 4.35 | 4.35 |
| B | 14.03 | 13.78 | 15.43 | 15.08 |
| EXPOSURE 31 KJ\M² | | | | |
| L | 64.53 | 64.34 | 66.26 | 65.02 |
| A | 3.35 | 3.33 | 3.34 | 3.59 |
| B | 15.31 | 15.06 | 16.88 | 16.67 |
| ΔE | 4.15 | 4.34 | 5 | 5.42 |
| EXPOSURE 93 KJ\M² | | | | |
| L | 66.02 | 66.18 | 66.26 | 66.74 |
| A | 3 | 2.92 | 3.34 | 3.15 |
| B | 16.42 | 16.22 | 16.88 | 17.37 |
| ΔE | 6.09 | 6.55 | 4.98 | 6.97 |
| EXPOSURE 193 KJ\M² | | | | |
| L | | | | 68.21 |
| A | | | | 2.66 |
| B | | | | 17.37 |
| ΔE | | | | 7.18 |
| EXPOSURE 388 KJ\M² | | | | |
| L | | | | 68.38 |
| A | | | | 2.53 |
| B | | | | 17.4 |
| ΔE | | | | 7.29 |

TABLE XI

Formulation Set 4
Weatherometer measurements

| | Type | | | |
|---|---|---|---|---|
| | 13 | 14 | 15 | 16 |
| ORIGINAL AVERAGE | | | | |
| L | 59.88 | 60.16 | 61.01 | 60.96 |
| A | 3.94 | 3.95 | 4.46 | 4.34 |
| B | 13.39 | 13.79 | 15.3 | 15.04 |
| EXPOSURE 31 KJ\M² | | | | |
| L | 66.54 | 66.53 | 65.62 | 65.61 |
| A | 3.21 | 3.21 | 3.45 | 3.49 |
| B | 16.31 | 16.14 | 16.89 | 16.68 |
| ΔE | 6.74 | 5.96 | 5.44 | 6.1 |
| EXPOSURE 93 KJ\M² | | | | |
| L | 67.33 | 68.03 | 66.8 | 67.11 |
| A | 2.97 | 2.85 | 3.05 | 3.01 |
| B | 16.22 | 16.58 | 17.6 | 17.28 |
| ΔE | 9.14 | 8.2 | 6.02 | 6.74 |

First, it should be noted that several tests were stopped at an early exposure, if the change in color was significantly above 6 units in Delta E (ΔE). Any test was also stopped if signs of crazing were apparent.

The direct comparison of each UV stabilization system, 1 vs. 5 vs. 9, shows dramatic differences in the performance. Examples 1 and 5 outperformed 9, which is to say that Lowilite 36 is a much better UVA than Lowilite 234, regardless of which HALS is used for this system. However, neither sample with Lowilite 36 and either HALS reached the full 2500 kJ without major changes in color or crazing. Therefore, additional additives were needed to achieve that goal. However, it is clear that a very specific UVA is necessary for these systems. Further data showed that additional additives could overcome this apparent weakness.

The effect of nitrogen purge on the compounding was not consistent between data sets. In general, though some specific comparisons did show a difference, e.g. Example 3 vs Example 4, in general, there were not large differences between samples prepared under standard conditions or with a nitrogen blanket.

The addition of the phosphite, by itself, did not result in dramatic changes in the weatherability, seen by comparing Examples 1 vs. 3; 5 vs. 7; 9 vs. 11. In each case, though some difference was seen, Delta E values of 5 or greater or crazing was seen in very short exposure times, much less than the 2500 kJ full exposure. The exception was a comparison of Example 1 vs. Example 3, and as previously stated this data set showed the best combination of UVA and HALS and may be specific to this nanocomposite system.

It should also be noted that in general most of the shift in Delta E values was due to the L value, becoming whiter. This effect, commonly called bleaching, is beneficial in these systems, and that small amount of $TiO_2$ can be added to mask this effect, further lowering Delta E values.

The use of broad absorption UVA materials in combination with thermal stabilizers results in materials that do not craze even at 2500 kJ exposure in SAE J1960 and with Delta E values of approximately 6. The addition of $TiO_2$ can mask the whitening effects to further reduce the change in color.

The invention is not limited to the above embodiments. The claims follow.

What is claimed is:
1. A weatherable polyolefin nanocomposite, comprising:
(a) polyolefin
(b) organoclay,
(c) compatibilizer, and

(d) UV stabilizers that filter wavelengths in a range influenced by presence of organoclay in the nanocomposite, wherein the organoclay is montmorillonite clay intercalated with an organic or semi-organic chemical.

2. The nanocomposite of claim 1, wherein polyolefin comprises any of homopolymers, copolymers, blends of polymers, mixtures of polymers, alloys of polymers, and combinations thereof, where at least one of the polymers is polymerized from an olefin monomer having 2 to 8 carbon atoms.

3. The nanocomposite of claim 2, wherein the polyolefin comprises wherein the polyethylene comprises low-density polyethylene, high-density, high molecular weight polyethylene, ultra-high molecular weight polyethylene, linear-low-density polyethylene, very-low density polyethylene, maleated polypropylene, polypropylene, polybutylene, polyhexene, polyoctene, and copolymers thereof, and ethylene-vinyl-acetate copolymer, and mixtures, blends or alloys of any of them.

4. The nanocomposite of claim 1, further comprising an impact modifier.

5. The nanocomposite of claim 4, wherein the impact modifier is selected from the group consisting of natural rubber, polyisoprene rubber, styrene-butadiene rubber, polybutadiene rubber, nitrile rubber, butyl rubber, ethylene-propylene-diene rubber (EPDM), ethylene-propylene copolymer, ethylene-hexene copolymer, ethylene-octene copolymer, and combinations thereof.

6. The composite of claim 1, wherein the compatibilizer is maleic anhydride grafted polypropylene.

7. The composite of claim 1, wherein the UV stabilizer is a chemical which has good absorption above 320 nm.

8. The composite of claim 7, wherein the UV stabilizer chemical filters light above 320 nm.

9. The composite of claim 8, wherein the UV stabilizer is a benzotriazole or a monomeric high molecular weight, sterically hindered amine light stabilizer.

10. The composite of claim 1, wherein the composite further includes optional additives.

11. The composite of claim 1, wherein the composite further includes optional polymers.

12. An article made from the weatherable polyolefin nanocomposite of claim 1.

13. The article of claim 12, wherein the article is a film of one layer or multiple layers.

14. The composite of claim 3, wherein the organoclay is montmorillonite clay intercalated with an organic or semi-organic chemical.

15. The composite of claim 3, wherein the compatibilizer is maleic anhydride grafted polypropylene.

16. The composite of claim 3, wherein the UV stabilizer is a chemical which has good absorption above 320 nm.

17. The composite of claim 16, wherein the UV stabilizer chemical filters light above 320 nm.

18. The composite of claim 17, wherein the UV stabilizer is a benzotriazole or a monomeric high molecular weight, sterically hindered amine light stabilizer.

* * * * *